Feb. 14, 1967  I. G. FONTENOT  3,303,895
DEGASIFICATION OF DRILLING MUD
Filed March 28, 1962  2 Sheets-Sheet 2
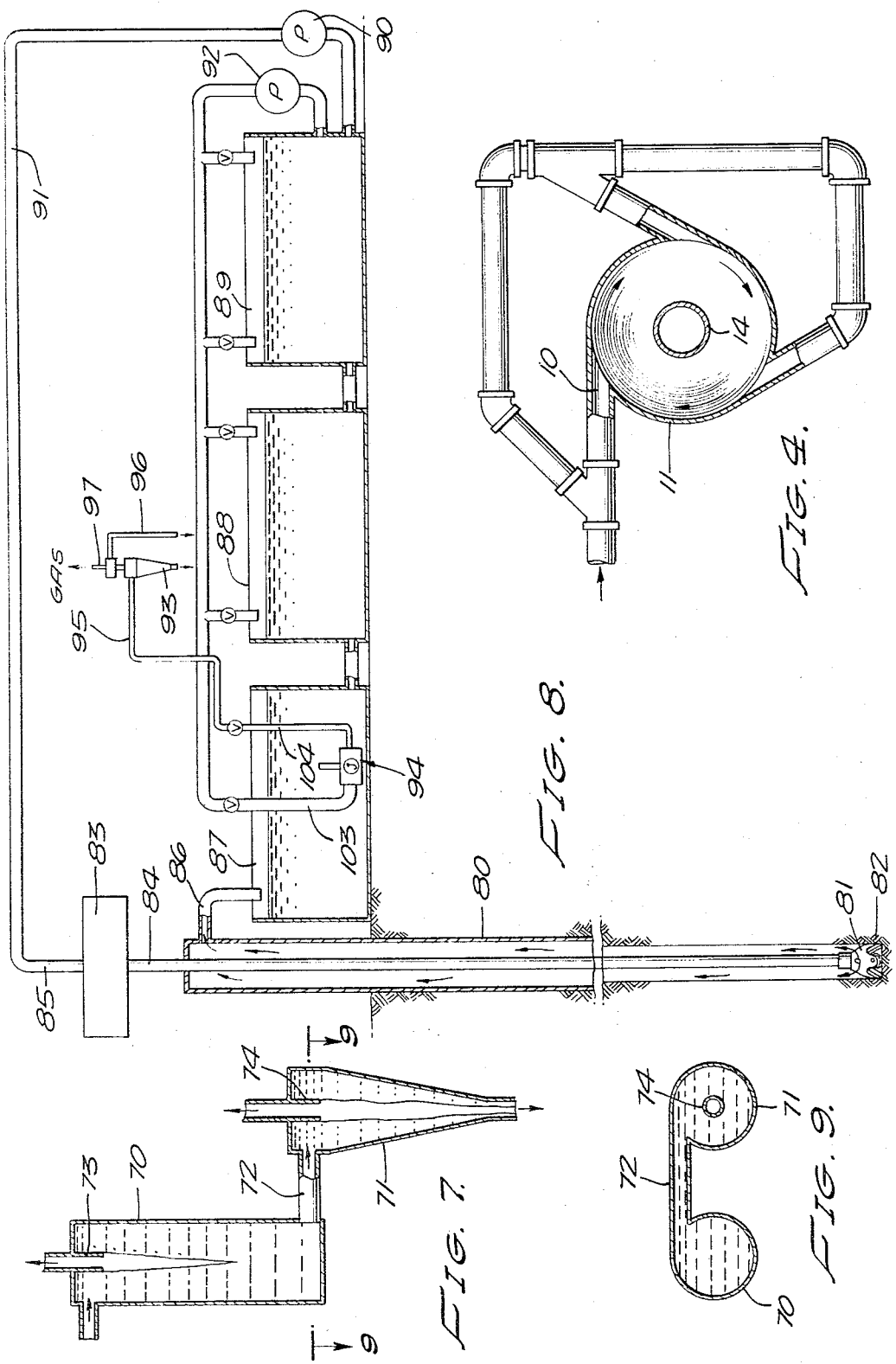

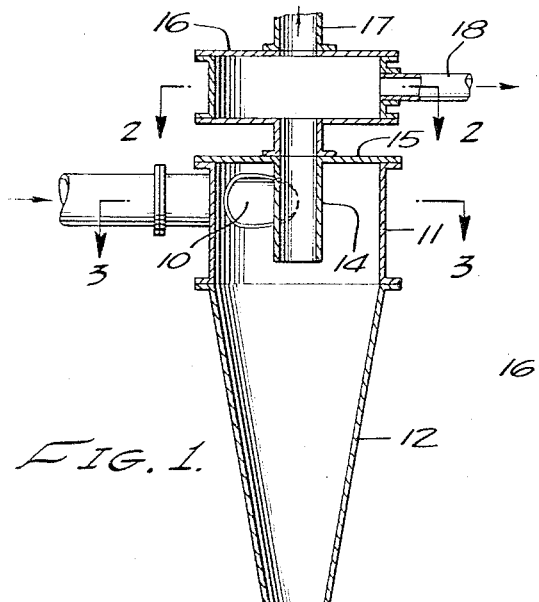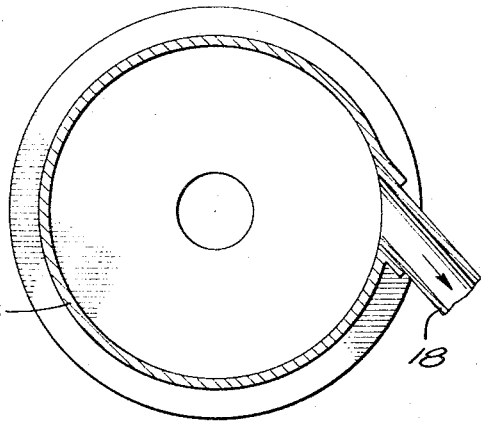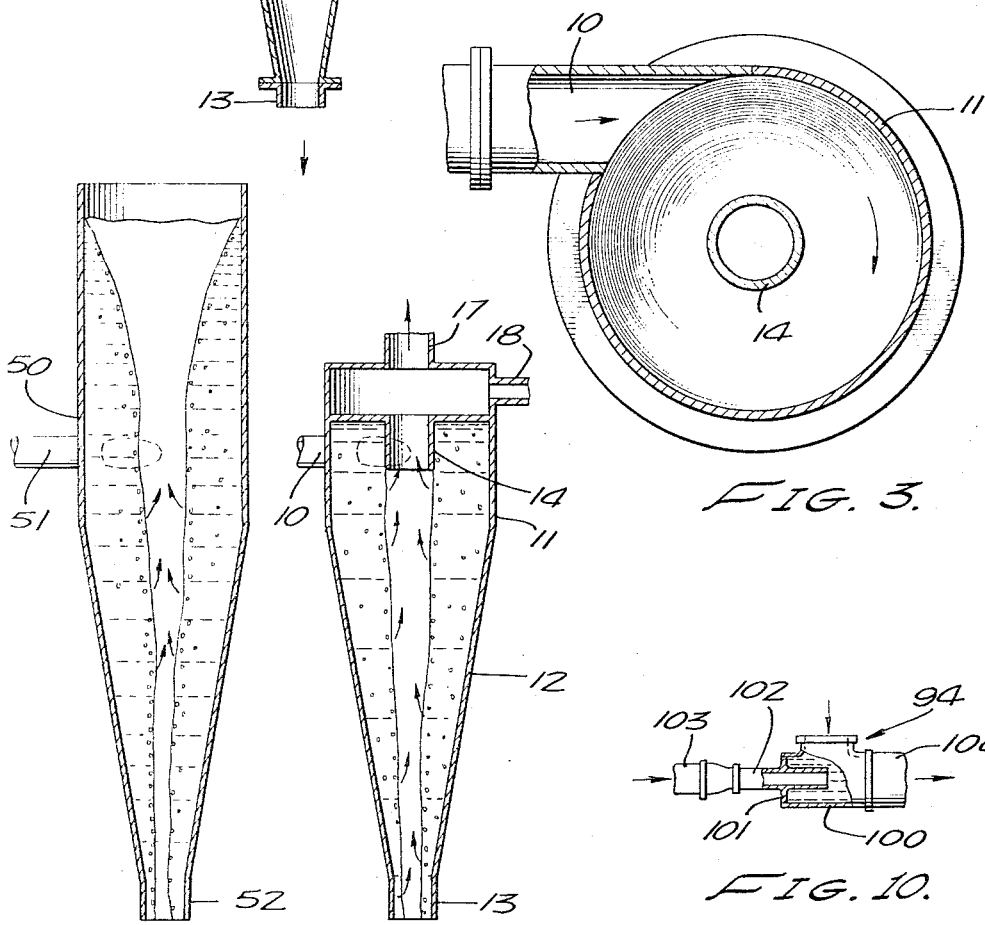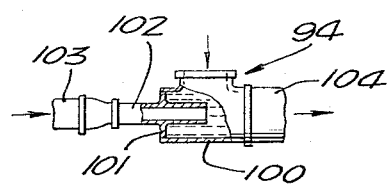
FIG. 1. FIG. 2. FIG. 3. FIG. 5. FIG. 6. FIG. 10.

United States Patent Office 3,303,895
Patented Feb. 14, 1967

3,303,895
DEGASIFICATION OF DRILLING MUD
Ison G. Fontenot, 517 Laurence Ave.,
Lafayette, La. 70501
Filed Mar. 28, 1962, Ser. No. 183,245
8 Claims. (Cl. 175—66)

This invention relates to the removal of gas from drilling mud, and more particularly to the employment of hydrocyclones in the inventive process.

A majority of wells drilled at the present time for oil and gas are drilled by the so-called rotary method, a feature of which is the employment of a circulating liquid mud, which is pumped to the bottom of the bore hole, where it issues in proximity to the bit, and then rises in the annular space between the drill pipe, which carries and rotates the bit, and the walls of the hole. The mud issues at the surface, and is then taken up by suitable apparatus and pumped back through the drill pipe to the bottom of the hole. Circulation in the manner described is virtually continuous during the drilling of the well. The hole is kept full of mud at all times, even during withdrawal of the drill pipe and bit, for the hydrostatic pressure of the mud is needed to keep formation fluids in place until the well can be completed.

Drilling mud for the usage just described commonly has a fluid phase consisting of water, although less frequently this may be oil or indeed an emulsion of oil in water or water in oil. This fluid base is also generally thickened to some extent by the use of additives, which comprise clay, bentonite, various special clays, any of many hydrophilic organic colloids, such as plant gums and sodium carboxymethylcellulose, all of which being for water base muds; and a host of essentially oleophilic thickeners, such as blown asphalt, soaps, and the like for oil base muds. Generally the density of the mud is increased over that of the base fluid itself, sometimes by the thickner just described, and sometimes by the further addition of insoluble finely divided materials of considerable density, such as limestone, barite, hematite and the like. In any case, as the well is drilled, solids become drilled up by the bit and to some extent become incorporated in the mud. The grosser cuttings are removed by screening or settling or a combination of these and similar actions, and indeed it is the ability to remove cuttings in this fashion that enables the substantially continuous drilling which is such a characteristic and valuable feature of the rotary method.

In order to suspend cuttings on their journey to the surface and also in order to suspend solid material deliberately added to the mud, such as clays and weighting materials, muds of the type considered are nearly always thickened to some extent, generally by the addition of materials which are able to impart a gel, i.e., a structural plasticity to the mud. A type of gel which increases in shear strength upon standing quiescent is regarded as especially valuable, since its ability to suspend cutings increases when the mud circulation is suspended for any reason.

Unfortunately it is not always possible to prevent gas from entering the circulating column of mud during the course of drilling. Often there will be a relatively high pressure gas stratum in an upper portion of the well, and if an attempt is made to shut this off by increasing the density of the mud, so as to counterbalance the gas pressure by hydrostatic pressure, then the mud column will actually open up formations elsewhere in the hole and the entire mud may be lost by a kind of fracturing operation.

A persistent problem in rotary drilling, acute in many particular drilling areas, is thus caused by the intrusion of gas into drilling mud. Drilling muds are not inexpensive and indeed may cost many dollars per barrel to prepare, especially if a large quantity of additives, particularly weighting materials, have been employed. Thus it is not economically feasible simply to discard mud when it occludes gas in the manner described. As will readily be appreciated, such occlusion of gas by the circulating mud lowers its density and may thus be the cause of a blow-out of the drilling well.

A number of expedients have been employed to remove gas from the circulating mud of a drilling well. For example, mud may be run over a riffle tower, or may be placed in a chamber and a partial vacuum applied. Chemical treatment of the mud to reduce its ability to entrap gas instead of releasing it, as, for example, charged water releases carbon dioxide by simple bubbling action, is of course employed where feasible, but especially with muds heavily treated with various additives it is not always possible to accomplish degasification without some type of mechanical treatment.

An object of the present invention is to provide a method for the rapid degasification of drilling mud.

Another object of the invention is to provide a method for the degasification of drilling mud using a hydrocyclone.

Another object of the invention is to provide a method of using a hydrocyclone in such a fashion that quite complete degasification takes place with a minimum of energy expended and equipment cost.

Other objects of the invention will appear as the description thereof proceeds.

In the drawings, FIGURE 1 is a side view, partly in section, of a typical apparatus as used in my invention.

FIGURES 2 and 3 are horizontal sections taken where indicated in FIGURE 1.

FIGURE 4 shows an alternative injection means for the device of FIGURE 1.

FIGURE 5 shows another apparatus which may be used in my invention.

FIGURE 6 shows the disposition of the drilling mud in the apparatus of FIGURE 1, during processing.

FIGURE 7 shows a two-stage hydrocyclone which I may alternatively use.

FIGURE 8 is a largely schematic representation of a drilling well, showing how my device and process are used in connection therewith.

FIGURE 9 is a horizontal section taken where indicated in FIGURE 7.

FIGURE 10 is a detail view of a jet pump usable in the apparatus of FIGURE 8.

Generally speaking, and in accordance with an illustrative embodiment of my invention, I introduce drilling mud which contains occluded gas into a hydrocyclone which has an underflow and overflow at such a rate (and it is generally a relatively high rate), and I permit withdrawal of the mud through the underflow of the hydrocyclone (by suitably operating the apex valve thereof or in any case providing a sufficiently large apex), that a liquid-free vortex is established and maintained centrally in the hydrocyclone, so as to provide an air conduit between the overflow and the underflow. The liquid-free vortex naturally communicates with the overflow. I have found that when a hydrocyclone is operated in this manner, the combination of the great centrifuging force and the very great agitation caused by the turbulent gyration of the mud in the hydrocyclone causes the occluded gas in the mud to be freed and to pass into the liquid-free vortex or "air column" whence it passes upwardly through the overflow and generally is discharged directly to the atmosphere. Of course, where a possible explosion hazard exists, the gas from the overflow may be conducted to a safe point by piping in the usual fashion.

As is of course well recognized, a hydrocyclone is a device which is generally in the shape of a cone, with its apex at the bottom, although various portions may be cylindrical, and which has means for introducing liquid at or near the top of the cone in such a fashion that a whirling motion is given to the liquid entering the hydrocyclone. This is most commonly accomplished by providing an inlet pipe which is tangential at its point of entry to the cone. A plurality of tangentially entering pipes may be provided. Less commonly, liquid may enter a plenum at the top of the hydrocyclone and the whirling motion be imparted as the liquid enters the hydrocyclone proper by providing a plurality of slots having inclined lips. I prefer and have found best the use of a hydrocyclone having a single tangential input.

At about the same height as the input, and extending both above and below this height, the hydrocyclone contains a short pipe. This open tube or pipe is vertical and central of the hydrocyclone, and has come to be known as a vortex finder. This stabilizes the formation of a vortex when the hydrocylcone is used as it is normally used in the mineral dressing art; wherein the hydrocyclone is kept full of liquid and some of the liquid passes out through the vortex finder while the balance is removed at the apex or lower end of the hydrocyclone. I have found that the vortex finder is desirable in my application as well where it serves to stabilize the liquid-free vortex centrally of the hydrocyclone when the latter is operated as I teach herein.

Hydrocyclones are commonly made of steel, and in many cases may have a liner, generally of rubber or synthetic rubber, which resists abrasion. A typical hydrocyclone is shown Lummus et al. Patent No. 3,016,962; in Marwill et al. Patent No. 2,919,898; in Fontein et al. Patent No. 2,819,795; and in Braun et al. Patent No. 2,816,658, the disclosures of all of which are hereby incorporated herein by reference.

The invention may be more readily apprehended by reference to the appended drawings. In the drawings, FIGURE 1 shows a typical hydrocyclone and indeed one of the type which I have found best for carrying out my invention. In this figure, mud is forced by pumping into the inlet 10, which is also shown in section in FIGURE 3. It will be apparent from the figures that the mud enters tangentially, and the rate of injection is maintained sufficiently high that in whirling around the inside of the cylindrical portion 11 and the conical portion 12 of the hydrocyclone shown in FIGURE 1, a liquid-free vortex is produced and maintained from top to bottom as shown in FIGURE 6. The mud exits through the open lower end, or underflow, 13 of the hydrocyclone. A vortex finder 14 in the form of a short section of pipe is held in position by the top 15 of the hydrocyclone, and the vortex finder communicates with the overflow fittings 16, which contains a vent 17 for the gas removed from the drilling mud, and an outflow pipe 18 to collect and lead away any mud which rises through the vortex finder. FIGURE 2 shows a horizontal section taken where indicated in FIGURE 1, and showing the preferred orientation of outflow pipe 18, which is best set tangentially so as better to collect the mud which may still have a whirling action upon rising through the vortex finder. Ordinarily, at least most of the time during the operation of the given hydrocyclone in accordance with the invention, substantially all of the mud will exit through the underflow, and it is generally expected that mud will seldom issue at the overflow.

I use the terms "overflow" and "underflow" in a very general sense in this disclosure and in the claims which follow. The overflow is simply whatever top opening is provided in the hydrocyclone whereas the underflow is whatever bottom opening is provided which is generally at the apex of the downward tapering conical section, as shown in FIGURE 1, but may indeed be simply an opening at the bottom of the cylindrical hydrocyclone, as appears in the left-hand portion of FIGURE 7.

A particularly simple variant appears in FIGURE 5, wherein I simply extend the cylindrical portion 50 of the hydrocyclone to a considerable height, leaving it free to the atmosphere at its upper end. The mud enters tangentially through an input pipe 51, essentially similar to the input pipe of FIGURE 1, and the whirling action given the mud is sufficient to maintain the liquid-free vortex between the open top of the hydrocyclone of FIGURE 5 (which open top is the overflow in this embodiment), and the bottom exit or underflow 52. Here again, the disposition of the mud during operation in accordance with my invention is shown in FIGURE 5. In the normal operation of this device, all of the mud forced into the hydrocyclone issues from the exit pipe 52.

An alternative input for the device of FIGURE 1 appears in FIGURE 4. This uses three tangential inlets, and is self-explanatory. However, as mentioned, for general use a single input is quite adequate.

Naturally, in operating hydrocyclones in accordance with the invention, I make suitable arrangements to collect the mud after it has passed through the hydrocyclone and has been treated thereby. The simplest and best expedient I have found to be that of simply mounting the hydrocyclone over a mud pit or tank so that the mud drops directly from the hydrocyclone exit tube into the mud tank. An arrangement of this sort is shown in FIGURE 8 which will be discussed in detail later.

I have found that it is sometimes advantageous, particularly in treating large volumes of mud, to pass the latter through a two-stage hydrocyclone, a typical embodiment of which is shown in FIGURE 7. Here a first hydrocyclone 70 of general cylindrical shape is connected to a second hydrocyclone 71 by an intermediate pipe or conduit 72. The intermediate pipe 72 takes off at the bottom of the first hydrocyclone 70 in a tangential fashion, as appears in the cross-sectional view of FIGURE 9, and enters the top portion of the second hydrocyclone 71 in a similar tangential fashion, as likewise appears from FIGURE 9. As before, the two hydrocyclones are provided with vortex finders 73 and 74, respectively, and both of these are, in this simplest case, merely vented to the atmosphere. The second hydrocyclone 71 is operated in accordance with my inventive process with a liquid-free vortex extending throughout the length of the hydrocyclone, as shown in FIGURE 7; while the first hydrocyclone, as a result of its cylindrical shape throughout, with a consequent reduction in angular velocity of the mud as one proceeds from top to bottom, because of wall friction, has a liquid-free vortex throughout a large portion of the hydrocyclone, although not necessarily communicating with its underflow, again as shown in FIGURE 7. A typical installation at a drilling well is shown in FIGURE 8, which is largely schematic. In this figure, 80 shows the upper cased portion of a well being drilled, with a bit 81 drilling in uncased formation 82. The rotary equipment is standard and thus is shown quite schematically, 83 representing the rotary table, 84 the drill pipe, and 85 the standpipe which is a conduit into which mud is pumped for circulation down through the drill pipe and up through the annular portion of the bore hole surrounding the drill pipe as shown by the arrows in FIGURE 8. The circulating mud issues through the flow pipe 86, and is collected in a first mud tank 87, which communicates with the second and third mud tanks 88 and 89, respectively, as shown in the figures. From the last mud tank 89, the mud is taken up by a mud pump 90 and pumped through mud line 91 to the standpipe 85 for recirculation down to the bottom of the hole. A secondary pump 92 is arranged in the usual fashion to supply mud under pressure for mixing, gunning, and like operations. In particular, the secondary pump 92 supplies the energy required to force mud into hydrocyclone 93, which is of precisely the type shown in FIGURE 1. I prefer and have found best the utilization of a simple jet injector 94 mounted inside of and near the bottom of tank 87. This jet injector is readily made up in known fashion from ordinary pipe fittings and a typical embodiment is shown in FIGURE 10. In this figure, 100 is an ordinary pipe T with its side outlet open so as to receive mud from tank 87, in which it is submerged. A bushing 101 in the outlet of the T holds a short section of pipe 102, which is fed with mud under pressure from pipe 103, which is also shown in FIGURE 8. The mud, still under pressure, and now representing both the mud pumped into the T through jet nozzle or pipe 102 and jet-pumped by Venturi action from tank 87 through the open side outlet of T 100, issues through pipe 104, whence it is led through the piping 95, shown in the figure, to the hydrocyclone 93. The latter is operated as has been described and substantially all of the mud issues through its underflow and is discharged directly into tank 88. Any mud passing through the overflow is led into tank 88 through down pipe 96. The gas removed from the mud is discharged to the atmosphere through vent pipe 97. The so-treated mud passes into tank 89, whence a portion is taken up by pump 90 for mud circulation as has been described and another portion by pump 92 to serve as an energy carrier for degasifying additional mud from tank 87.

Treatment of drilling mud which contains occluded gas, particularly as a result of its entrapment by the shear strength or gel strength characteristic of the mud, so as to degasify it in accordance with the present invention, has many advantages over other ways which have been proposed or even used for this purpose. Some of course have been referred to hereinabove. For example, devices used in accordance with my invention are remarkably simple, both in construction, operation and maintenance. They have no moving parts, and may be constructed so as to have relatively light weight which makes for easy transportability and installation. The devices are sufficiently inexpensive and may be included as a standard part of the equipment and mounted on the mud tanks when first rigging up, so that they will be ready for instant use later if a degasification problem arises in the course of drilling of the well. The accessory equipment is standard and ordinarily consists, as described above, of one of the secondary pumps always present in a rotary drilled well and ordinary piping. Degasification has been proposed in the past by the use of vacuum pump chambers or like devices or by centrifuges or even by combination of these. Such installations have many moving parts and generally present severe maintenance and operations problems. Moreover, my device presents no priming problems: the inventive process can be brought into operation by merely starting up a mud pump, given the installation in the first place. A most remarkable feature of my inventive process is that the apparatus operates under a superimposed pressure. There is thus a positive drive, so to speak, and it is astonishing that such remarkably effective degasification action takes place under pressure, particularly in view of the fact that many prior inventors have felt compelled to go to vacuum devices instead.

Another remarkable feature of my invention is that because of the low cost of operation and the high throughput which is possible it is convenient and practicable for me to circulate several times as much mud through the hydrocyclone in a given period of time as issues from the flow pipe of the drilled well during the same time. In contrast, many prior art degasification installations, because of their mechanical complexity, are sufficiently taxed merely to treat the mud issuing from the flow pipe. I have found, and indeed in accordance with a sub-aspect of my inventive process, that degasification is rendered considerably easier by recirculating already degasified mud in admixture with mud to be degasified. While I do not wish to be held to a theory of operation to explain the advantages of this process, I believe that the phenomenon is related to the superior rheological characteristics of the degasified mud. In the ordinary course of operation, for example, where the mud circulating in the set-up of FIGURE 8 becomes continuously contaminated with occluded gas as a result of the drilling operation, the mud discharged into tank 87 will have a characteristic semi-solid fluffy nature, arising at least in part from the fact that gassy mud is really an emulsion of fine gas bubbles in a semi-plastic liquid matrix, and thus exhibits enhanced plasticity for the same reason that most emulsions do. On the other hand, by the time the mud has been degasified and eventually discharged into tank 89, it is much improved rheologically, and this degasified mud, when used as a carrier to take up additional mud from tank 87 and forced into hydrocyclone 93, aids the degasification by what may be ordinarily described as diluting bad mud with good mud. In any case, my findings are as have been described, whatever the ultimate explanation may be.

As a detailed example of operation in accordance with the invention, I may relate highly successful operation with an apparatus constructed precisely as shown in FIGURE 1, except for relative scale of the parts, wherein the apparatus parts shown were of steel, the input pipe 10 has an inside diameter of ¾ inch, the cylindrical portion 11 of the hydrocyclone has an internal diameter of 4 inches and a vertical height of 12 inches, while the conical portion 12 has a height of 6 inches, tapering from a top diameter of 4 inches to an apex or underflow diameter of 1¾ inches, and in which the vortex finder has an internal diameter of 1 inch and an external diameter of 1¼ inches, and extends downward from the top 15 for a distance of 5 inches. Gassy clay-barite-water mud from a drilling well, with a plastic viscosity as measured in accordance with the American Petroleum Institute's standard mud testing code of 25 centipoises and a mud weight of 12 lbs. per gallon, was pumped into the hydrocyclone at an input pressure of 25 to 30 lbs. per square inch gauge, and all of it issued at the apex, at an operating rate of 120 gallons per minute. Degasification was completed in a single pass and the mud was then fit for recirculation in the well. In this particular example, the mud was introduced into the hydrocyclone using a jet injection device, as shown in FIGURES 8 and 10, and the ratio of the mud pumped into the T through jet pipe 102 to that entering that of the side outlet directly from the tank was about 15:1.

It will be clear, of course, that it is not necessary to use a jet pump for the mud input to the hydrocyclone as I have described in connection with FIGURE 8. The mud may be taken from any desired point of the system, e.g., directly from the flow line or from any of the mud tanks, and pumped directly into the input of the hydrocyclone with an ordinary mud pump as will be well understood by those skilled in the art.

It will be observed that the invention accomplishes its objects, and that a degasification process has been provided by the invention which offers remarkable advantages as hereinbefore set forth.

It will be appreciated that while my invention has been described with the aid of and in accordance with various specific embodiments and explanations, many Having described the invention, I claim:

1. A process of treating drilling mud containing occluded gas so as to remove said gas from said mud which comprises forcing said mud into the inlet of a hydrocyclone having an underflow and an overflow and withdrawing at least a portion of said mud through said underflow, said inlet rate and said withdrawal being sufficiently great to permit the establishment of and maintenance of a liquid-free vortex centrally of said hydrocyclone and providing a liquid-free air conduit between said overflow and said underflow, said air conduit being conducted directly to the atmosphere.

2. A process of treating drilling mud containing occluded gas so as to remove said gas from said mud which comprises forcing said mud into the inlet of a first hydrocyclone having an underflow and an overflow and withdrawing at least a portion of said mud through said underflow, said inlet rate and said withdrawal being sufficiently great to permit the establishment and maintenance of a liquid-free vortex centrally of said hydrocyclone and communicating with said overflow, and subsequently passing at least a portion of the mud discharged from said first hydrocyclone to a second hydrocyclone, likewise having an underflow and an overflow, at an inlet and discharge rate sufficient to permit the establishment and maintenance of a liquid-free vortex centrally of said second hydrocyclone and providing a liquid-free air conduit between said second overflow and said second underflow, said air conduit being conducted directly to the atmosphere.

3. The process of drilling a well by the rotary method in which a drilling mud is circulated to the bottom of a bore hole defining said well, thence upward to the surface, and thence downward into said bore hole in continuous circulation, in the course of which drilling said mud occludes gas, which includes the step of forcing said mud through a hydrocyclone having an underflow and an overflow and withdrawing at least a portion of said mud through said underflow, said inlet rate and said withdrawal being sufficiently great to permit the establishment of and maintenance of a liquid-free vortex centrally of said hydrocyclone and providing a liquid-free air conduit between said overflow and said underflow, said air conduit being conducted directly to the atmosphere, whereby said gas is removed from said mud.

4. The process of drilling a well by the rotary method in which a drilling mud is circulated to the bottom of a bore hole defining said well, thence upward to the surface, and thence downward into said bore hole in continuous circulation, in the course of which drilling said mud occludes gas, which includes the step of forcing said mud through a first hydrocyclone having an underflow and an overflow and withdrawing at least a portion of said mud through said underflow, said inlet rate and said withdrawal being sufficiently great to permit the establishment and maintenance of a liquid-free vortex centrally of said hydrocyclone and communicating with said overflow, and subsequently passing at least a portion of the mud discharged from said first hydrocyclone to a second hydrocyclone, likewise having an underflow and an overflow, at an inlet and discharge rate sufficient to permit the establishment and maintenance of a liquid-free vortex centrally of said second hydrocyclone and providing a liquid-free air conduit between said second overflow and said second underflow, said air conduit being conducted directly to the atmosphere, whereby said gas is removed from said mud.

5. A process of treating drilling mud containing occluded gas so as to remove said gas from said mud which comprises forcing said mud into the inlet of a hydrocyclone having an underflow and an overflow and withdrawing at least a portion of said mud through said underflow, said inlet rate and said withdrawal being sufficiently great to permit the establishment of and maintenance of a liquid-free vortex centrally of said hydrocyclone and providing a liquid-free air conduit between said overflow and said underflow, said air conduit being conducted directly to the atmosphere, and in which said mud is forced into said inlet after having been first admixed with at least a portion of the mud previously issued from said underflow.

6. A process of treating drilling mud containing occluded gas so as to remove said gas from said mud which comprises forcing said mud into the inlet of a first hydrocyclone having an underflow and an overflow and withdrawing at least a portion of said mud through said underflow, said inlet rate and said withdrawal being sufficiently great to permit the establishment and maintenance of a liquid-free vortex centrally of said hydrocyclone and communicating with said overflow, and subsequently passing at least a portion of the mud discharged from said first hydrocyclone to a second hydrocyclone, likewise having an underflow and an overflow, at an inlet and discharge rate sufficient to permit the establishment and maintenance of a liquid-free vortex centrally of said second hydrocyclone and providing a liquid-free air conduit between said second overflow and said second underflow, said air conduit being conducted directly to the atmosphere, and in which said mud is forced into said first inlet after having been admixed with at least a portion of the mud previously issued from said second underflow.

7. The process of drilling a well by the rotary method in which a drilling mud is circulated to the bottom of a bore hole defining said well, thence upward to the surface, and thence downward into said bore hole in continuous circulation, in the course of which drilling said mud occludes gas, which includes the step of forcing said mud through a hydrocyclone having an underflow and an overflow and withdrawing at least a portion of said mud through said underflow, said inlet rate and said withdrawal being sufficiently great to permit the establishment of and maintenance of a liquid-free vortex centrally of said hydrocyclone and providing a liquid-free air conduit between said overflow and said underflow said air conduit being conducted directly to the atmosphere, and in which said mud is forced into said hydrocyclone after having been first admixed with at least a portion of the mud previously issued from said underflow, whereby said gas is removed from said mud.

8. The process of drilling a well by the rotary method in which a drilling mud is circulated to the bottom of a bore hole defining said well, thence upward to the surface, and thence downward into said bore hole in continuous circulation, in the course of which drilling said mud occludes gas, which includes the step of forcing said mud through a first hydrocyclone having an underflow and an overflow and withdrawing at least a portion of said mud through said underflow, said inlet rate and said withdrawal being sufficiently great to permit the establishment and maintenance of a liquid-free vortex centrally of said hydrocyclone and communicating with said overflow, and subsequently passing at least a portion of the mud discharged from said first hydrocyclone to a second hydrocyclone, likewise having an underflow and an overflow, at an inlet and discharge rate sufficient to permit the establishment and maintenance of a liquid-free vortex centrally of said second hydrocyclone and providing a liquid-free air conduit between said second overflow and said second underflow, said air conduit being conducted directly to the atmosphere; and in which said mud is forced into said first hydrocyclone after having been admixed with at least a portion of the mud previously issued from said second hydrocyclone, whereby said gas is removed from said mud.

(References on following page)

References Cited by the Examiner
UNITED STATES PATENTS

| | | | |
|---|---|---|---|
| 2,754,968 | 7/1956 | Vegter et al. | 209—211 |
| 2,816,490 | 12/1957 | Boadway | 55—191 X |
| 2,816,658 | 12/1957 | Braun et al. | 209—211 |
| 2,819,795 | 1/1958 | Fontein et al. | 209—211 |
| 2,849,930 | 9/1958 | Freeman | 55—191 |
| 2,886,287 | 5/1959 | Croley | 175—206 |
| 2,919,898 | 1/1960 | Marwil et al. | 176—66 |
| 2,923,151 | 2/1960 | Engle et al. | 175—206 X |
| 2,941,783 | 6/1960 | Stinson | 175—66 X |
| 3,016,962 | 1/1962 | Lummus et al. | 175—66 |
| 3,101,313 | 8/1963 | Woodruff | 209—211 |

ERNEST R. PURSER, *Primary Examiner.*

BENJAMIN BENDETT, *Examiner.*

CHARLES E. O'CONNELL, W. J. MALONEY,
*Assistant Examiners.*